April 4, 1961 A. POLICH, JR 2,978,128
DETACHABLE GOOSENECK HYDRAULIC CONNECTOR FOR TRAILERS
Filed March 12, 1956 2 Sheets-Sheet 1
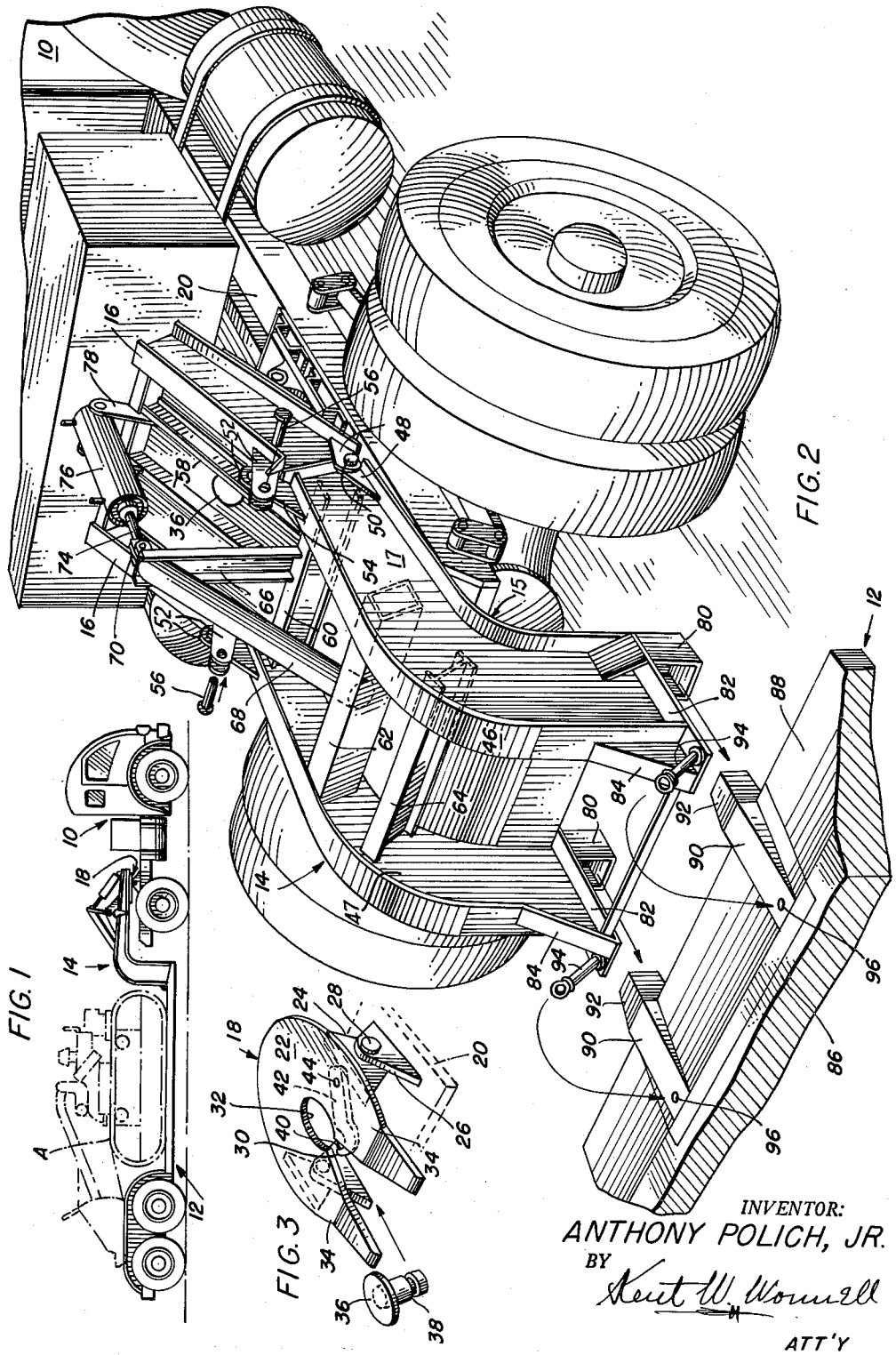
INVENTOR:
ANTHONY POLICH, JR.
BY
ATT'Y April 4, 1961 A. POLICH, JR 2,978,128
DETACHABLE GOOSENECK HYDRAULIC CONNECTOR FOR TRAILERS
Filed March 12, 1956
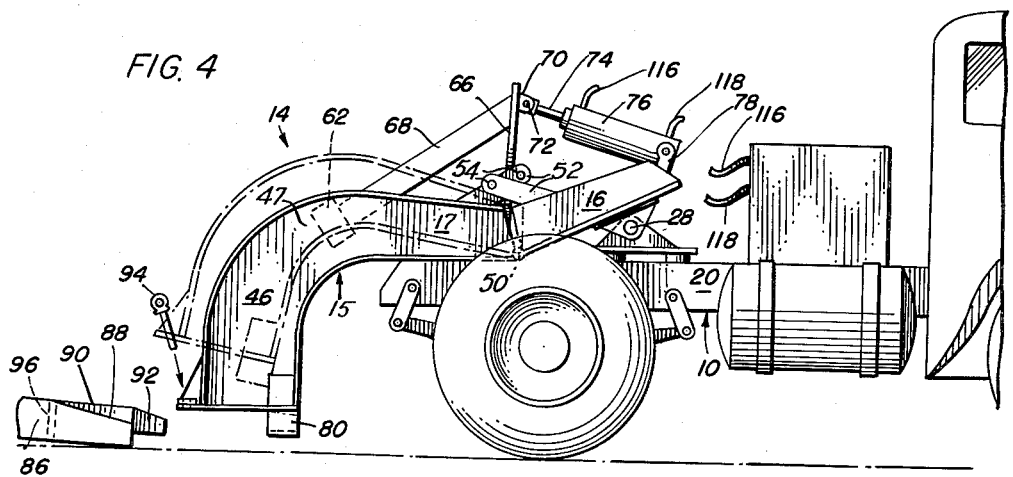
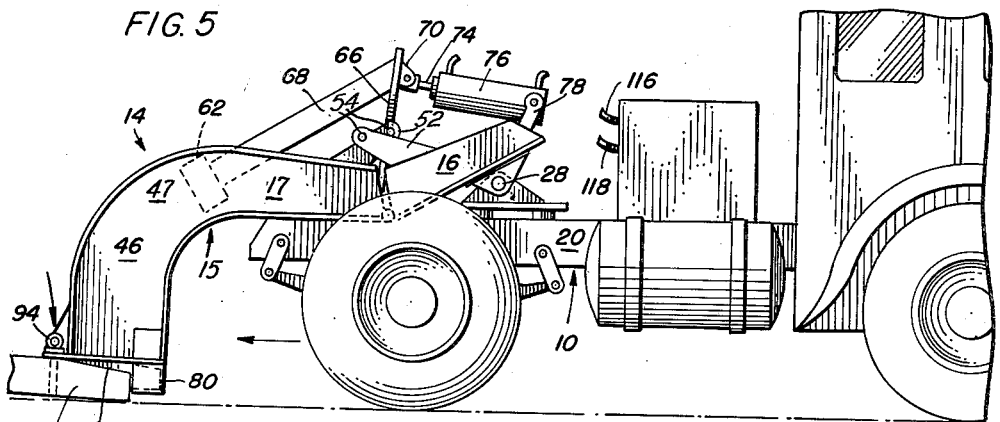
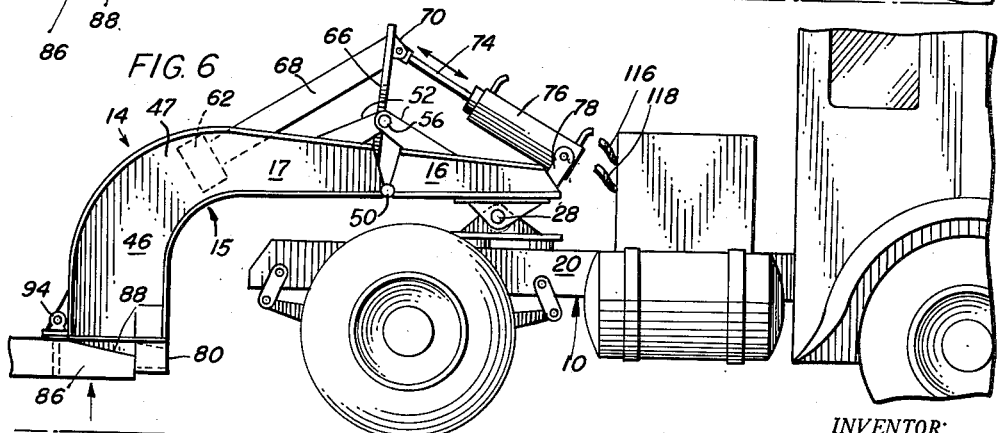
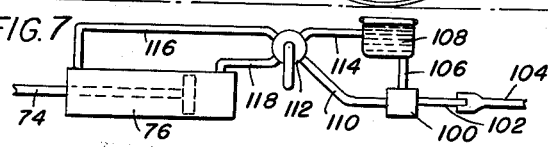
INVENTOR:
ANTHONY POLICH, JR.
BY
Kent W. Wonnell
ATT'Y

United States Patent Office 2,978,128
Patented Apr. 4, 1961

2,978,128
DETACHABLE GOOSENECK HYDRAULIC CONNECTOR FOR TRAILERS

Anthony Polich, Jr., Brookfield, Ill.
(8746 40th St., Lyons, Ill.)

Filed Mar. 12, 1956, Ser. No. 570,977

11 Claims. (Cl. 214—506)

This invention relates in general to a detachable connector for a truck and trailer commonly designated as a goose-neck which is attached to a power truck and is detachable from one end of the trailer so that the trailer is easily grounded for loading and unloading.

Truck and trailer combinations are now commonly connected by solid goose-necks which are raised and lowered by hydraulic devices, pneumatic jacks, cable drives, or chain drives, which obtain their power from the truck for effecting the raising and lowering operation of the goose-neck and of an end of the trailer.

The present invention utilizes power means for operation but effects the raising and lowering movement by a hinging action of pivotally connected end portions of the goose-neck connector and wherein a front section rocks relative to a rear section.

An important object of the invention is to provide a goose-neck connector having portions hinged with respect to each other and relatively operated by power means to raise and lower a part of the connector and one end of a trailer to which said part is attached.

A further object of the invention is to provide a simple structure which may be easily controlled and is adapted for simple operation by one man.

A further object of the invention is to provide a connection between a truck and trailer adapted to lower the trailer to clear overhead obstruction.

A still further object of the invention is to provide a truck and trailer connection in which the trailer may be raised at one end to clear street obstructions.

A further object of the invention is to provide a truck and trailer connection which is easily attached to the trailer and disengaged therefrom, for rapid loading and unloading of the trailer.

A further object of the invention is to provide means for securely locking the goose-neck to the truck at all times so that there is no danger of losing it.

Still a further object of the invention is to provide a double acting power cylinder for operating the hinged parts of the goose-neck by controls which may be located inside of the cab of the power truck.

Still a further object of the invention is to provide a simple, durable, and relatively inexpensive goose-neck construction which may be readily built, mounted on a power truck and connected and disconnected from a trailer with relative ease and simplicity of operations.

Other objects of the invention will appear in the specification and will be apparent from the accompanying drawings in which, Fig. 1 is a side elevation of a power truck and a low bed trailer attached thereto by a goose-neck in accordance with this invention.

Fig. 2 is a perspective view on an enlarged scale of a goose-neck as shown in Fig. 1, showing the parts for connection to the truck and to the trailer.

Fig. 3 is a perspective view of the fifth wheel construction by which the goose-neck is connected to the power truck.

Figs. 4, 5 and 6 are side elevations showing the gooseneck in different relations with respect to the power truck and to the trailer, Fig. 4 showing the goose-neck lowered and disconnected from the end of the trailer; Fig. 5 showing the goose-neck lowered and connected to the end of the trailer; and Fig. 6 showing the goose-neck and the end of the trailer connected and in raised positions; and Fig. 7 is a somewhat diagrammatic view showing the hydraulic power connections.

The present hinged goose-neck has connected frame parts which are strong and light and are not cumbered with heavy operating parts in the goose-neck itself. The hydraulic operating mechanism is relatively light and strong, but still produces high power due to hydraulic pressure.

Referring now more particularly to the drawings, a power truck 10 is connected to a low bed type of trailer 12 by a goose-neck 14 as shown more clearly in Fig. 1. The goose-neck is connected to the truck for infrequent disconnection and it is connected to the trailer for frequent disconnection in accordance with well known practices, so that the front end of the trailer may be lowered to the ground and disconnected from the goose-neck to facilitate the loading and the unloading of heavy and cumbersome machines, such as a caterpillar shovel, which may be quickly transported from one location to the other by the trailer truck combination.

A fifth wheel 18 is mounted upon the truck sills 20 behind the truck cab, and includes a platform 22. Said fifth wheel includes a pair of bearing brackets 26 which are fixed to and rise from the sills 20. The platform 22 has ears 24 fixed to and depending therefrom and which overlap the brackets 26 and are connected thereto by pins 28, as best seen in Figure 3. The pins 28 form a horizontal pivot which is disposed crosswise of the truck or tractor 10 and about which the platform 22 is mounted for vertical rocking movement. The platform 22 of the fifth wheel 18 is provided with a central opening 32 and a slot 30. The restricted inner or forward end of the slot 30 communicates with the opening 32 and said slot is flared rearwardly and opens outwardly of the rear end of the platform 22. The rear portion of the platform 22 is defined by the rearwardly tapered platform portions 34 which straddle the slot 30 and the rear end portions of which are inclined downwardly relative to the plane of the platform 22. A kingpin 36 has a stem portion which turnably fits in the opening 32 and which is movable through the slot 30 into and out of engagement with the opening 32 and the fifth wheel 18.

In order to keep the kingpin in releasable engagement with the fifth wheel construction, the kingpin stem, is provided near its lower end with a groove 38 adapted to be engaged by a hook 40 at the end of a latch 42 having a pivot 44 connecting it with the under side of the plate 22, and movable to engage the notch 38 of the kingpin for releasable engagement therewith.

The gooseneck 14 includes a forward section 16 and a rear section 15. Said front section 16 is straight and engages on the platform 22. The kingpin 36 is connected to the front section 16 and extends downwardly therefrom through the platform opening 32 for connecting the gooseneck to the fifth wheel 18 for swivelling movement about the axis of the kingpin 36. Furthermore, the forward gooseneck section 16 is fulcrumed for rocking movement about the horizontal axis 28 when mounted on and connected to the platform 22.

The rear gooseneck section 15 includes a substantially straight forward portion 17 and a rear portion 46 which is connected by the bend 47 of the section 15 to the rear end of said portion 17, and which portion 46 extends downwardly from the bend 47. The rear gooseneck section 15 is of rigid construction.

The rear end of the forward section 16 has rearwardly extending ears 48 which overlap forwardly extending ears 48 which project from the forward end of the portion 17 and said overlapping ears 48 of the section 16 and portion 17 are connected by pivot elements 50 which form a knee joint or hinge joint, the axis of which is disposed behind the axis of the fulcrum 28 and parallel thereto, as seen in Figures 4, 5 and 6. The adjacent ends of the section 16 and portion 17, above the hinge joint 50, are beveled to allow the knee joint 50 to break downwardly to its position of Figures 4 and 5, from its raised, extended position of Figure 6.

The section 16 and portion 17 are of substantial vertical thickness, as illustrated in Figures 2, 4, 5 and 6, and have rigid arms 52 extending from the upper edges of the adjacent ends thereof which are inclined toward one another so that the free ends of said arms 52 will be in overlapping relation to one another as seen in Figure 6 with apertures 54 thereof in registration, when the gooseneck parts 16 and 17 are disposed in alignment as seen in Figure 6. The aligned apertures 54 of the arms 52 of the gooseneck parts 16 and 17 are connected by pins 56, as seen in Figure 6, for locking the knee joint 50 to retain the gooseneck 14 rigidly in its raised position of Figure 6.

The front section 16 is strengthened by parallel bars 58 and the portion 17 is strengthened by an end cross beam 60 and a hollow cross piece 62, while the bend 47 includes a cross beam 64, as seen in Figure 2.

At the hinged end of the gooseneck portion 17 and extending upwardly therefrom is a rigid standard 66, secured at its bottom to the end cross beam 60 and having an inclined brace 68, preferably circular and hollow, extending between and connected to the top of the standard 66 and to the hollow cross piece 62. Brackets 70 are secured to the upper part of the standard 66 and are connected by a pivot pin 72 to the end of a piston rod 74 which projects outwardly from one end of a double acting cylinder 76. The other end of the cylinder is pivotally mounted in trunnions 78 which are secured to and rise from the forward end of the gooseneck section 16. When the hydraulic power unit 74, 76 is extended from its position of Figures 4 and 5, the gooseneck parts 16 and 17 are moved toward their aligned positions of Figure 6, and when the power unit 74, 76 is retracted, the front section 16 rocks about the fulcrum 28 to assume a downwardly and rearwardly inclined position when the rear gooseneck section 15 is lowered, as seen in Figure 5.

At the lower end of the rear gooseneck part 46 at the under side of each side beam thereof is a structural box 80 formed of sturdy metal and having an open rear end forming a socket which is spaced from the rear extremity of a plate 82 overlying the socket and box 80 and forming a part of the gooseneck portion 46. Extending from the rear end of each side plate 82 is an angular brace 84 which engages and strengthens the rear extremity of the plate 82.

At the forward end of a platform 86 forming the bed of the trailer is an inclined portion 88 to ease the passage of machines and other articles loaded on and unloaded from the platform. At this end of the platform are projections 90 with tapered extremities 92 extending beyond the end of the platform and adapted to detachably fit tightly in the sockets formed by the boxes 80. The lower sides of these extremities 92 are preferably raised above the lower edge of the platform 84 so that these extremities will be free from the ground or a surface upon which the end of the platform 86 is supported, thereby allowing the boxes forming the sockets to be easily engaged with and disengaged from the extremities 92. When the gooseneck is firmly engaged with the extremities 92, the plates 82 will overlie the projections 90 and will rest thereon, and fastening bolts 94 which are shown in inclined positions in Fig. 2 are inserted through openings of the plates 82 and into holes 96 at the inner portions of the projections 90 for locking the gooseneck rigidly to the forward end of the platform 86.

When the truck and trailer are connected in driving relation by the gooseneck 14, the power means 74, 76 consisting of the piston and cylinder are energized to project the piston rod from the cylinder and to align the parts 16 and 17 in the conveying position as shown in Fig. 1 and Fig. 6. To disengage the gooseneck from the front of the trailer, pressure is admitted to the outer end of the cylinder 76 after removing the pins 56 so that the gooseneck sections can be moved to a position at an angle to each other as shown in Fig. 5. At this time, by removing the fastening bolts 94, the platform of the trailer may be disengaged from the gooseneck 14 by moving the power truck forwardly and disengaging the extremities 92 from the sockets 80. When moved outwardly therefrom, the rear of the gooseneck may be supported in partially raised position as shown in Fig. 4 so that the bottom of the gooseneck or the boxes 80 thereon do not have a dragging engagement with the ground or surface upon which the wheels of the truck are supported. This can be accomplished by supplying additional pressure to the forward end of the cylinder 76, which will cause an upward swinging movement of the rear gooseneck section 15 from the full line to the dotted line position thereof as seen in Figure 4, due to the fact that the hinge joint 50 is then resting on the sills 20 so that the rear section 15 must swing upwardly since further downward swinging movement of the front section 16 is prevented.

In connecting the power truck to the lowered end of the trailer platform, the trailer part of the goose-neck may be lowered or adjusted in height by the piston cylinder power device so that the socket boxes 80 are in alignment with the projecting extremities 92 as represented in Fig. 5, after which the power truck is moved rearwardly for engaging the under sides of the plates 82 with the upper sides of the projections 90, thereby engaging the extremities 92 in the socket boxes 80 and aligning the holes in the plates 82 with the holes 96 of the trailer for the insertion of the bolts 94.

When this connection is made, the power means 74, 76 is extended to align the parts 16 and 17 in the raised conveying position of the goose-neck, and the pins 56 are again inserted and the truck and trailer are connected for driving operation.

For operating the hydraulic power means, a pump 100 has a projecting shaft 102 which is connected to a power take-off shaft 104 for driving it. The pump has a pipe connection 106 with a reservoir 108 and also a connection 110 with a four-way valve 112. This valve also has a relief connection 114 with the reservoir 108. Extending from the valve to one end of the cylinder 76, is a pipe connection 116, and extending from the valve to the other end of the cylinder is a pipe connection 118. The connections 116 and 118 are preferably flexible hose so that the cylinder and the forward part 16 to which it is connected may be freely moved. The valve 112 may be located within the cab of the truck 10 if desired, and is operated in a well known way to connect the pump to either end of the cylinder, and at the same time to connect the other end of the cylinder through the valve to the supply reservoir 108. In this way, none of the hydraulic liquid such as oil is lost and a high pressure may be applied to the cylinder depending upon the lifting power desired.

With this power means, it is possible to lower the trailer to a limited extent if there is not sufficient overhead clearance, and it is also possible to raise the trailer platform to provide a greater road clearance.

Although the power means is described as located externally of the goose-neck, it may be located therein by providing a small gasoline engine or a battery motor as the power source.

In driving the truck and trailer, the pins 56 should be installed as this will take the load off of the power means cylinder and will maintain the parts of the goose-neck in proper load supporting relation. The front gooseneck section 16 is always connected to the fifth wheel except when the latch 42 is manually disengaged from the king pin 36 which insures that the goose-neck is securely locked to the power truck at all times during loading or unloading.

With this construction, the power truck and the trailer are easily connected and disconnected requiring the attention of one operator and without the necessity of special tools or implements to connect and disconnect the parts. In the construction and fabrication of the goose-neck itself, it is easier to connect and assemble the necessary elements of two parts than it is to install and connect the same elements in a single heavier and more cumbersome part.

While a preferred construction has been described in some detail, it should be regarded as an illustration or example rather than as a limitation or restriction of the invention, since various changes in the construction, combination and arrangement of the parts may be made without departing from the spirit and scope of the invention.

I claim:

1. Coupling means for attaching a low-bed semi-trailer to a fifth wheel on a tractor comprising, in combination, a gooseneck type drawbar having means adjacent one end for detachable connection with the semi-trailer and means adjacent the other end for detachable connection with the fifth wheel, said drawbar comprising, in combination, front and rear sections having juxtaposed ends, means connecting said sections at said ends for relative swinging movement about an axis disposed transversely of the drawbar, and a hydraulic actuator connected between said sections and operative to swing said sections relative to each other for raising and lowering said rear section relative to the ground whereby said rear section can be alined with the connecting means on the front end of the trailer and whereby the front end of an attached semi-trailer can be lowered to the ground for loading and unloading and can be raised into normal transport position for hauling.

2. A gooseneck for connecting a truck and trailer, said gooseneck including a forward portion and a rear portion, said rear portion constituting a rigid depending extension of the rear end of said forward portion, said forward portion including a forward end, means adapted to connect said forward end to a truck, said means including a pivot for fulcruming said forward end about a horizontal axis disposed beneath said forward end and crosswise of the gooseneck, said forward portion of the gooseneck having a hinge joint disposed between and spaced from the rear end thereof and from said fulcrum and disposed parallel to the fulcrum, and an extensible power unit bridging said hinge joint and connected to the parts of the forward portion of the gooseneck disposed on opposite sides of the hinge joint, said depending rear portion of the gooseneck being adapted to be connected to a forward end of a trailer whereby said forward trailer end is supported in an elevated position by the gooseneck when said power unit is extended for maintaining the hingedly connected parts of the forward portion thereof substantially in alignment with one another, said forward end of the forward gooseneck portion rocking about said fulcrum when said power unit is retracted to assume an inclined position downwardly and toward the hinge joint to permit said hinge joint and the part of the gooseneck disposed rearwardly thereof to assume a lowered position.

3. A gooseneck for coupling a truck and trailer, said gooseneck having a rear portion including a lower end adapted to be secured to and rising from a forward end of a trailer, said gooseneck including a forward portion forming a forwardly projecting extension of the upper end of said rear portion, means adapted to connect a forward end of said forward portion to the truck including a pivot disposed beneath said forward end and crosswise of said forward portion and constituting a fulcrum about which said forward end has vertical rocking movement, said forward portion including a hinge joint disposed between said rear portion and said fulcrum and parallel to said fulcrum, the part of the forward portion disposed between the rear portion and hinge joint being rigidly disposed relative to said rear portion, and an extensible power unit spanning said hinge joint and connected to said forward portion of the gooseneck above and on opposite sides of said hinge joint whereby when said power unit is extended said forward end will be rocked in one direction about the fulcrum for elevating the hinge joint and the rear portion of the gooseneck, said forward end rocking in the opposite direction about the fulcrum to lower the hinge joint and the rear portion when said power unit is retracted.

4. A gooseneck for coupling a truck and trailer comprising a forward section and a rear section, means adapted to connect said forward section to a truck including a pivot disposed beneath the forward section and forming a fulcrum disposed crosswise of the gooseneck, said rear section having a forward end, a hinge joint connecting the forward end of said rear section to the adjacent rear end of the forward section, said rear section including a downwardly extending rear portion having a lower end adapted to be connected to a forward end of a trailer platform, said rear section being rigid from end-to-end thereof, said hinge joint being disposed between and spaced from said fulcrum and said rear portion, and an extensible power unit connected to said forward section and rear section and disposed above and spanning the hinge joint, said power unit being extensible for rocking the forward section about the fulcrum in a direction for raising the hinge joint and said rear section, and said power unit being retractable for rocking the forward section in the opposite direction for lowering the hinge joint and rear section.

5. A gooseneck as in claim 4, said rear section including a forward portion extending between the hinge joint and said rear portion and combining with said forward section to form a substantially straight upper gooseneck portion when the gooseneck is in a raised load conveying position and with said power unit in an extended position.

6. A gooseneck as in claim 4, said means connecting the forward section to the truck comprising a fifth wheel including a platform disposed above said fulcrum, and means detachably and swivelly mounting said forward section on said platform.

7. A gooseneck as in claim 4, and means detachably connecting the lower end of said rear portion rigidly to the forward end of the trailer platform for rigidly mounting said rear gooseneck section on the trailer platform.

8. A gooseneck as in claim 5, and means detachably interconnecting said forward portion to the forward section to rigidly retain said sections in said load conveying position of the gooseneck and with said forward section substantially in alignment with the forward portion of the rear section.

9. A gooseneck as in claim 6, said hinge joint being adapted to be disposed above a portion of the truck chassis and behind the fifth wheel and being movable into engagement with the truck chassis when the gooseneck is lowered whereby said hinge joint is adapted to fulcrum on the truck chassis to effect a raising of the rear gooseneck section, when disengaged from the trailer platform, by movement of the power unit to a fully retracted position.

10. A gooseneck as in claim 7, said last mentioned means comprising projections extending forwardly from the forward end of the trailer platform, and rearwardly opening sockets depending from the lower end of said rear portion of the rear gooseneck section and in which said projections are received, said projections having undersides upwardly offset relative to the underside of the forward end of the platform whereby said sockets may be moved into and out of engagement with the projections when the forward end of the platform is resting on a flat surface.

11. A gooseneck as in claim 10, said platform having a downwardly and forwardly inclined upper surface at its forward end forming a ramp to facilitate movement of vehicles onto and off of the platform, when disconnected from the gooseneck, for loading and unloading, respectively, the trailer.

References Cited in the file of this patent

UNITED STATES PATENTS

| | | |
|---|---|---|
| 2,389,211 | Pointer | Nov. 20, 1945 |
| 2,545,584 | Meadows | Mar. 20, 1951 |
| 2,628,126 | Black | Feb. 10, 1953 |
| 2,653,827 | Manning | Sept. 29, 1953 |
| 2,667,363 | Talbert | Jan. 26, 1954 |